United States Patent
Peach et al.

(10) Patent No.: US 6,964,233 B2
(45) Date of Patent: *Nov. 15, 2005

(54) BEAM ISOLATOR

(75) Inventors: Walter J. Peach, South Elgin, IL (US); John D. Anderson, Aurora, IL (US)

(73) Assignee: ZefTek, Inc., Montgomery, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/926,761

(22) Filed: Aug. 26, 2004

(65) Prior Publication Data

US 2005/0022690 A1 Feb. 3, 2005

Related U.S. Application Data

(63) Continuation of application No. 10/428,526, filed on May 2, 2003, now Pat. No. 6,786,160.

(51) Int. Cl.$^7$ .............................................. B65D 59/00
(52) U.S. Cl. ..................... 105/406.1; 16/2.1; 105/404; 105/411
(58) Field of Search ............................. 105/404, 406.1, 105/408, 407, 411, 423, 390; 16/2.1, 2.5; 174/152 R, 153 R

(56) References Cited

U.S. PATENT DOCUMENTS

| | | | |
|---|---|---|---|
| 2,102,658 A | 12/1937 | Weisenburg | |
| 2,209,274 A | 7/1940 | Jaberg | |
| 2,731,292 A | 1/1956 | Cole | |
| 3,288,407 A * | 11/1966 | Downer et al. | ................ 16/2.1 |
| 4,010,854 A | 3/1977 | Manyek | |
| 4,440,095 A | 4/1984 | Mathieu | |
| 4,471,857 A | 9/1984 | Murphy | |
| 4,784,068 A | 11/1988 | Burke | |
| 4,795,007 A | 1/1989 | Murphy et al. | |
| 4,913,062 A | 4/1990 | Burke | |
| 4,917,021 A | 4/1990 | Murphy | |
| 5,031,268 A | 7/1991 | McCabe | |
| 5,239,933 A | 8/1993 | Murphy et al. | |
| 5,295,652 A | 3/1994 | Byrne | |
| 5,415,108 A | 5/1995 | Murphy et al. | |
| 5,579,697 A | 12/1996 | Burke | |
| 5,596,177 A | 1/1997 | Stark et al. | |

(Continued)

OTHER PUBLICATIONS

ZefTek Car Parts Advertisement written by ZefTek, Inc., published Aug. 15, 1998.

(Continued)

*Primary Examiner*—Mark T. Le
(74) *Attorney, Agent, or Firm*—Bell, Boyd & Lloyd LLC

(57) ABSTRACT

A beam isolator which is inserted into at least one end of a tubular beam in a railroad car to minimize the movement of the beam during movement of the railroad car. The beam isolator includes first and second isolating pads, each defining openings. A hinge connects the first and second isolating pads at a first end of said first and second isolating pads. A stopping member is attached to and transversely projects from a second end of the first and second isolating pads. The first and second isolating pads are closed or folded about the hinge until the first and second isolating pads are substantially adjacent to each other, which substantially aligns the openings defined by the first and second isolating pads. The beam isolator is then inserted into at least one end of the beam until the stopping members engage the edges of the end of the beam.

43 Claims, 6 Drawing Sheets

U.S. PATENT DOCUMENTS

| | | | |
|---|---|---|---|
| 5,598,936 | A | 2/1997 | Murphy |
| 5,682,964 | A | 11/1997 | Murphy |
| 5,701,825 | A | 12/1997 | Peach, Jr. |
| 5,975,818 | A | 11/1999 | Burke et al. |
| 6,018,967 | A | 2/2000 | Hedeen et al. |
| 6,142,082 | A | 11/2000 | Burke et al. |
| 6,367,590 | B1 | 4/2002 | Burke |
| 6,439,557 | B1 | 8/2002 | Stitt |
| 6,786,160 | B1 * | 9/2004 | Peach et al. ................ 105/404 |

OTHER PUBLICATIONS

ZefTek Cost Cutting Car Component Advertisement written by ZefTek, Inc., published prior to 2002.

Freight Car Components Advertisement written by The Holland Company, published prior to 2002.

Rail Car Components Advertisement written by The Holland Company, published prior to 2002.

* cited by examiner

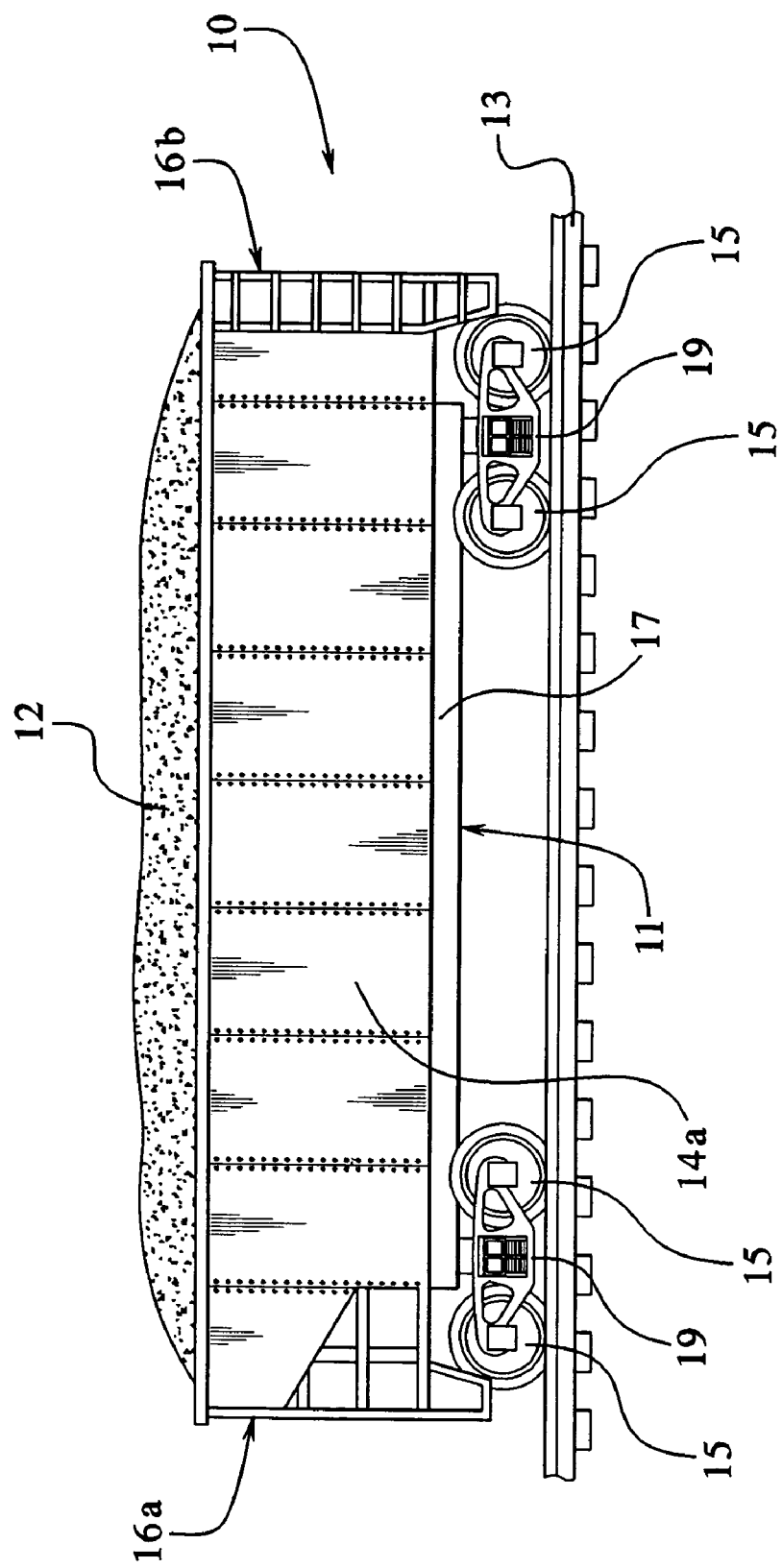

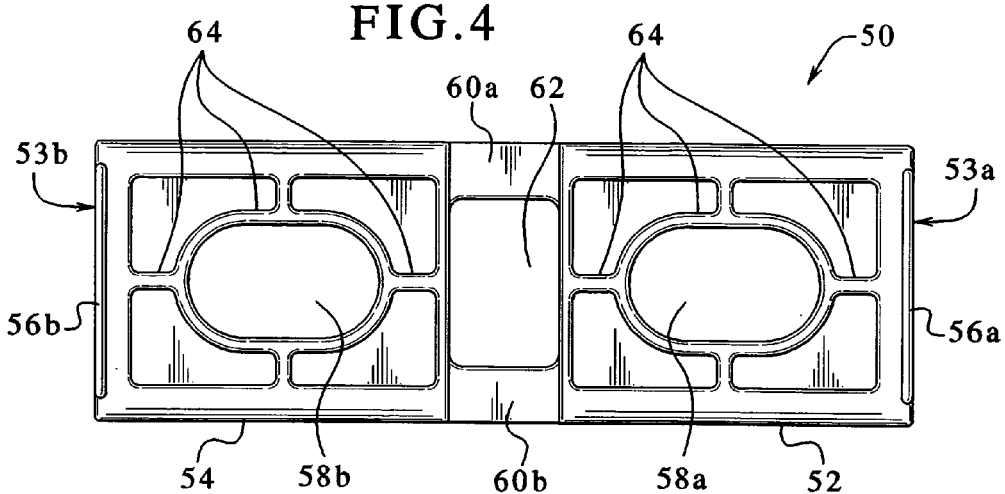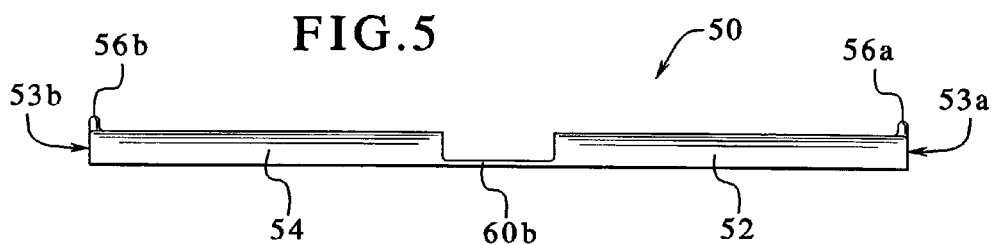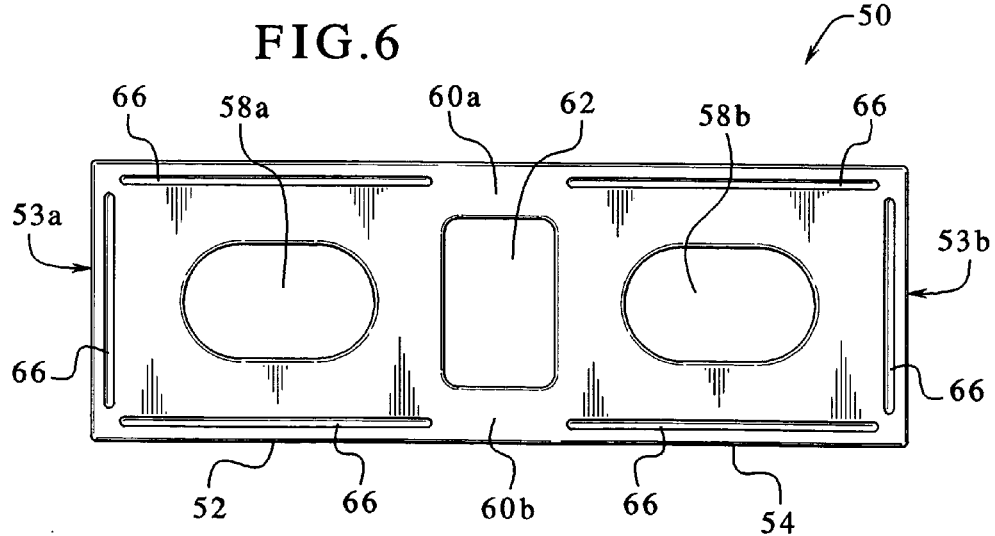

BEAM ISOLATOR

PRIORITY CLAIM

This application is a continuation of, claims priority to and claims the benefit of U.S. patent application Ser. No. 10/428,526, filed May 2, 2003, now U.S. Pat. No. 6,786,160, the entire contents of which are incorporated herein.

BACKGROUND OF THE INVENTION

The present invention generally relates to a beam isolator and more specifically to a cross beam isolator for a railroad car such as a coal railroad car. The railroad industry utilizes a variety of railroad cars for transporting products. Many of these railroad cars transport heavy loads of raw materials or products that cause significant stresses to the railcar's structure during movement of the cars. As a result, wear occurs on the various parts of such railcars. Wear can also occur on the railroad cars when the cars travel empty due to increased vibration and movement which is prevented when the cars are fully loaded.

One such railcar is a coal railroad car or coal car. Coal cars transport heavy loads of coal to various destinations. The substantial weight of the coal in the railcar can cause significant stresses to the body of the coal car, and specifically to the side walls of the coal car. During movement of a coal car, the movement and vibration of the coal in the coal car in addition to gravity, forces the coal outwardly against the walls and in particular the side walls of the coal car. Such car also often travels empty.

Coal cars and other railroad cars are sometimes constructed with various types of beams, supports, braces and connecting parts to maintain the structure, strength and integrity of the railroad cars. However, over time, the stresses generated during the movement of the car and the transportation of the raw materials or other products from one location to another, can cause the beams, supports, braces and other connecting parts to wear. As a result, significant costs and time may be expended to maintain and/or replace the various components and parts of railroad cars such as coal cars.

Therefore, there is a need for a device for railroad cars which helps to maintain the integrity of the components and parts in the railroad cars while increasing the resistance of the components and parts to wear which can be caused during the movement of the cars and during the loading, unloading and transportation of the raw materials or products in these cars.

SUMMARY OF THE INVENTION

The present invention is directed to a beam isolator which reduces or minimizes wear on beams, supports, braces and other connecting parts in railroad cars which can be caused by the stress forces of transporting heavy loads in these cars. Additionally, the present invention reduces or minimizes the wear on railroad cars due to the movement of the cars which causes vibration and other added stresses on the beams, supports, braces and connecting parts.

Railroad cars are often used to transport heavy loads of materials. The present invention can be used for any suitable railroad car. For purposes of this application, the present invention is described in relation to coal railroad cars or coal cars. However, such description is not intended to limit the present invention. Typically, a coal car includes a frame supported by trucks, each of which have several wheels which roll along railroad tracks. The frame supports two metal side walls, two metal end walls and a metal bottom wall. The side walls, end walls and bottom wall are connected together to form an interior compartment which stores the coal. The interior compartment of the coal car includes metal tubular generally horizontally disposed beams, supports or braces and angled tubular beams, supports or braces which are connected to mounts, mounting brackets or side plates attached to the walls such as the side walls of the coal car. The metal walls are usually made of steel or aluminum and the beams, supports or braces and mounting plates are usually made of steel or aluminum. The tubular beams provide stability and strength to the side walls and minimize or prevent the outward force of the coal from bulging out the side walls of the car during loading, unloading and movement of the coal car.

In one preferred embodiment, the beam isolator of the present invention is inserted into the ends of the tubular beams prior to connecting the tubular beams to the mounting brackets. Prior to such insertion, the beam isolator is in a substantially open or unfolded position. The beam isolator is manually closed or folded and inserted into each end of the tubular beam. It should be appreciated that the beam isolator may alternatively be mechanically folded and inserted into an end of a tubular beam using an automated process such as robotic apparatus or other suitable automated apparatus. After the beam isolator is inserted into each end of the tubular beam, the ends of the beam are connected to the mounting brackets attached to the walls or floor of the interior of the railroad car. A mounting bracket connector is inserted through each end of the beam or support, the beam isolator and the respective mounting bracket to secure the beam to the mounting brackets on each side wall of the coal car. A nut, washer(s) and bolt or other suitable locking device is used to secure each beam in place.

The beam isolators reduce or minimize the potential wear to the beam or support, the mounting brackets and the connectors which can potentially occur due to the back and forth and up and down movement of the beams with respect to the mounting brackets during movement of the car due to vibration and other forces when the car is empty and during loading, unloading and movement of the loaded coal car. The beam isolators minimize the metal to metal contact between the mounting brackets, beam ends and the connectors, to minimize or reduce the friction and stresses on these parts or components. As a result, the wear created between these components is minimized and/or prevented, which causes these components to last longer and need fewer repairs and/or replacement. Therefore, the costs and time needed to repair and/or replace these components are reduced.

In one embodiment, the beam isolator includes a first isolating pad and a second isolating pad and a hinge which connects a first end of the first isolating pad and a first end of the second isolating pad. The hinge is preferably a live hinge including spaced apart hinge members; however, any suitable hinge or hinged connection may be employed in accordance with the present invention. In one embodiment, in the closed or folded position, the hinge is outwardly biased or biased to further enable the beam isolator to be held in place inside the end of the tubular beam. Additionally, the first and second isolating pads each include second ends, which are generally free ends and are preferably not connected to each other.

In one preferred embodiment, stopping members, stopping lips or lips are attached to or extend from the second or free ends of the first and second isolating pads. The stopping members or lips may be suitably attached to or integrally formed with the second or free ends of the isolating members. The stopping members transversely protrude, extend or project from the surface of each of the isolating pads to engage the ends, edges or end edges of each side of the tubular beam or support to prevent the beam isolator from being inserted too far into the end of the tubular beam. The stopping members also minimize the time spent by a user making sure that the beam isolators are inserted properly into the ends of the tubular beams. It should thus be appreciated that a user can thereby insert several cross beam isolators into the respective ends of a group, lot or bundle of tubular beams in a short amount of time prior to mounting the beams in the railroad car.

In one embodiment, the first and second isolating pads each define openings, which are substantially aligned when the first isolating pad and the second isolating pad are moved, rotated or otherwise folded towards each other about the hinge. In one preferred embodiment, the openings are larger than the openings defined in the ends of the tubular beams and the mounting brackets to account for potential misalignment problems, different sized connectors and different positions of the connectors once the connectors are inserted through the ends of the tubular beams and mounting brackets. The openings enable a suitable connector such as a mount, bracket or plate connector to be inserted through the beam isolator and mount, mounting bracket or plates to secure the ends of the tubular beams to the mount, mounting bracket or plates.

In one embodiment, the beam isolator is manufactured using a suitable durable plastic or polymer material or any suitable self-lubricating material. In one embodiment, the beam isolators are manufactured using an injection molding process. Each beam isolator is preferably molded to a substantially uniform thickness and includes suitable release walls and grooves formed in the first and second isolating pads of the beam isolators. Specifically, the release walls can be formed on one side or surface of the first and second isolating pads and enable the molded beam isolators to be easily released from an injection molding apparatus. The grooves are formed on the opposite side or surface of the beam isolator from the side including the release walls and enable the beam isolators to cool quickly and uniformly after the injection molding process. It should be appreciated that the beam isolators of the present invention may be manufactured using any other suitable manufacturing process. It should be appreciated that the beam isolators of the present invention may be made in different sizes and/or shapes for different size railroad car beams, supports and braces.

It is therefore an advantage of the present invention to provide a beam isolator for insertion into at least one end of a tubular beam, support or brace in a railroad car to minimize or reduce potential wear of the beam, support or brace and associated mount, mounting bracket or plate during movement of the railroad car.

A further advantage of the present invention is to provide a beam isolator which is easily and quickly insertable into the ends of a beam, support or brace for a railroad car.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE FIGURES

FIG. 1A is a perspective view of a coal railroad car.

FIG. 4 is a front view of one embodiment of the beam isolator of FIGS. 3A to 3C.

FIG. 5 is a side view of the embodiment of the beam isolator of FIGS. 3A to 3C.

FIG. 6 is a rear view of the embodiment of the beam isolator of FIGS. 3A to 3C.

DETAILED DESCRIPTION OF THE INVENTION

The present invention is directed to a beam isolator which reduces or minimizes potential wear on beams, supports or braces and other connecting parts in railroad cars such as coal railroad cars. As indicated above, the one embodiment of the beam isolator of the present invention is described in detail below in relation to coal railroad cars or coal cars, although it should be appreciated that the present invention is also suited for other suitable types of railroad cars.

Figure 1B:
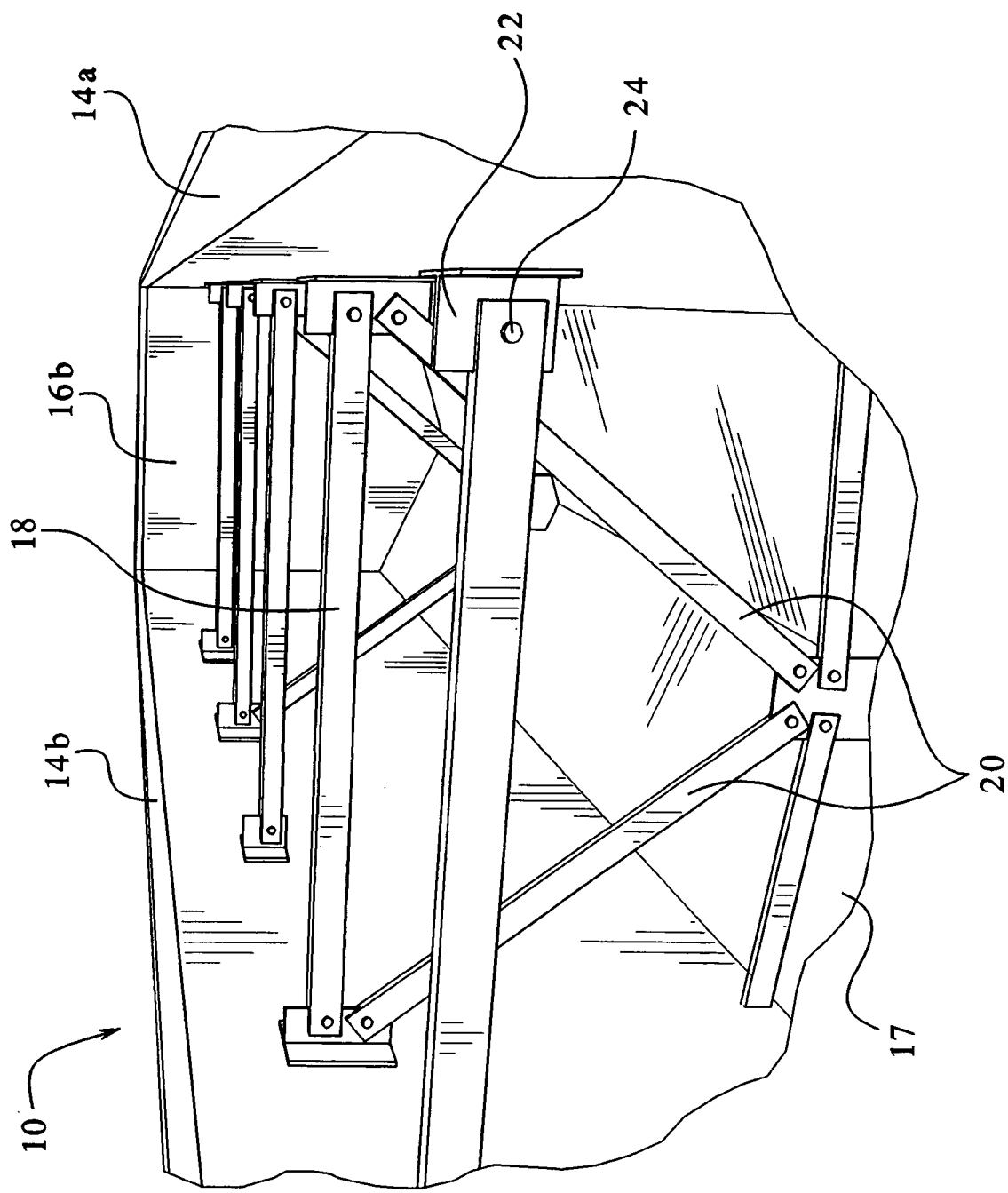
FIG. 1B is a fragmentary perspective view of the interior of the coal railroad car of FIG. 1A.

Referring to FIGS. 1A and 1B, certain railroad cars such as a coal car 10 are used to transport heavy loads of materials such as coal 12. The coal car 10 generally includes a frame 11 supported by trucks 19, each of which have several wheels 15 which roll along conventional railroad tracks 13. The frame 11 supports two side walls 14*a* and 14*b*, two end walls 16*a* and 16*b* and a bottom wall 17. The side walls 14*a* and 14*b*, end walls 16*a* and 16*b* and bottom wall 17 are welded together or connected in any other suitable fashion to form an interior compartment which stores the coal 12.

The interior compartment of the coal car 10, which is defined by the side walls 14*a* and 14*b*, the end walls 16*a* and 16*b* and the bottom wall 17, holds the coal during transportation. The coal car 10 includes horizontally or substantially horizontally extending tubular beams, supports or braces such as the beams 18 and angled beams, supports or braces such as the angled beams 20 which are connected to mounts, mounting brackets or side plates 22 attached to the side, end or bottom walls. The tubular beams 18 and angled tubular beams 20 provide stability and strength to the side walls 14*a* and 14*b* and minimize or prevent the outward force of the coal from bulging out the sides of the car during movement of the coal car. The beams 18 and 20 are connected to mounts, mounting brackets or side plates 22, which are secured on each side or the bottom wall of the coal car 10 to the side walls 14*a* and 14*b* using the beam connectors or connectors 24. The connectors 24 may be any suitable connectors or fasteners such as nuts, washers and bolts or rivets or other suitable connecting devices.

Referring to FIGS. 2A, 2B, 2C, 3A, 3B and 3C, in one embodiment, a beam isolator 50 of the present invention is inserted into each end of each tubular beam 18 and/or each angled tubular beam 20 of the coal car prior to connecting the beams to the mounting brackets 22. Initially, the beam isolator 50 is in a substantially open or unfolded position as shown in FIGS. 3B, 3C, 4, 5 and 6 and as further described below. The beam isolator 50 is manually closed or folded and inserted into each end of the beam. It should be appreciated that the beam isolator may alternatively be mechanically closed or folded and inserted into an end of a beam using a suitable automated process. After the beam isolator 50 is inserted into each end of a beam, the ends of the beam are connected to the mounting brackets 22. A beam connector or connector such as a bolt 24 or other suitable connector is inserted through the openings defined in the opposing side walls of the ends of the beam, the beam isolators inserted in those ends, and the mounting brackets to secure the tubular beam to the mounting brackets 22 on the walls or floor of the coal car. The connector 24, in one embodiment, includes washers 76a and 76b, a nut 78, or other suitable locking connectors or devices to secure the bolt 24 in place. It should be appreciated that any suitable connectors or fasteners may be used to secure the beams, supports or braces to the mounting brackets.

As described above, the movement of the loaded coal cars causes the coal to push outwardly against the walls of the coal car and specifically, the side walls 14a and 14b of the coal car. In addition, the movement of the coal car causes the coal to shift, which causes the coal to push outwardly on the side walls. The continuous outward movement of the coal in addition to the vibration of the coal car itself, can cause the beams to move back and forth and up and down relative to the mounting brackets of the coal car. This can cause the beams, mounting brackets and connectors and other related components to wear. Additionally, as indicated above, when the coal car is empty, the car is subject to vibration and twisting during movement. This can also cause the beams, mounting brackets and connectors and other related components to wear.

The beam isolators 50 of the present invention reduce or minimize this back and forth and up and down movement of the beams 18 or 20 relative to the mounting brackets 22 during movement of the empty or loaded coal car. The beam isolators 50 also minimize the metal to metal contact between the mounting brackets, ends of the beams and the connectors, which further reduces the potential wear between and stresses on these parts or components. As a result, the potential wear created between these components is minimized and/or prevented, which can cause these components to last longer and need fewer repairs and/or replacement. This can also reduce the costs and time needed to repair and/or replace these components.

Referring now more specifically to FIGS. 2A to 6, in one illustrated embodiment of the present invention, the beam isolator 50 includes a first isolating pad 52 and a second isolating pad 54. The first isolating pad and second isolating pad 52 and 54, respectively, are connected at a first end by a hinge as shown. The hinge is preferably a live hinge including hinge members 60a and 60b which in one embodiment, are spaced apart and define an opening 62; however, any suitable hinge, hinged connection or hinge configuration may be employed in the present invention. The hinge is preferably configured to cause the first and second pads to be substantially aligned when the first and second isolating pad are moved or folded about the hinge. In one embodiment, the hinge outwardly biases the first and second isolating pads towards the opposing inside or interior surfaces 72a and 72b of the beam 18 or 20 to facilitate the frictional engagement of the exterior or outer engaging surfaces of the pads of the beam isolator with the interior or inside surfaces of the walls of the tubular beam thereby holding the beam isolator in place in the end of the beam. The first and second isolating pads also include second, opposing or free ends 53a and 53b, which are not connected to each other.

Figure 2A:
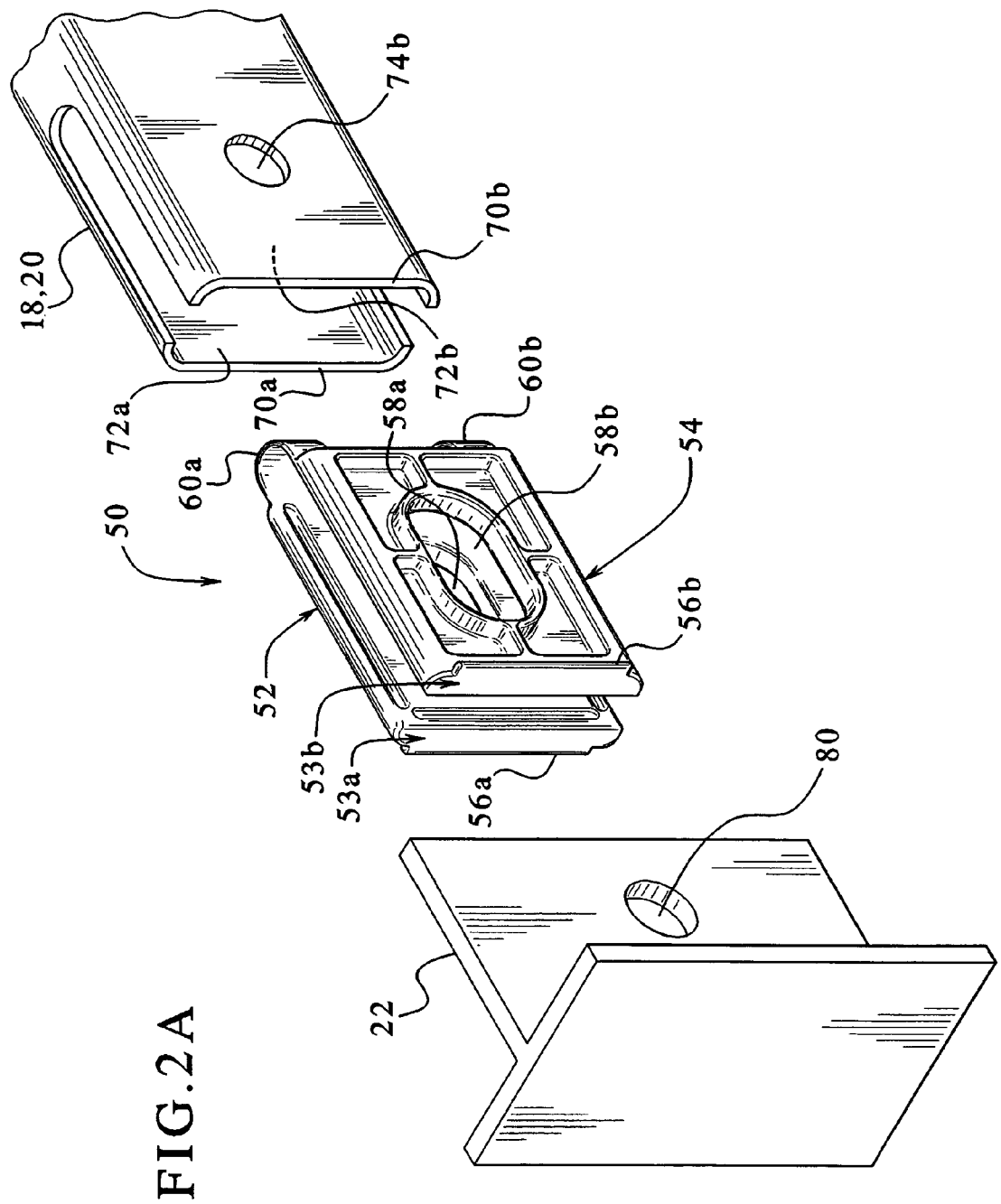
FIG. 2A is an exploded perspective view of one embodiment of the beam isolator of the present invention illustrating the beam isolator, the end of a tubular beam and a mounting bracket.
Figure 2B:
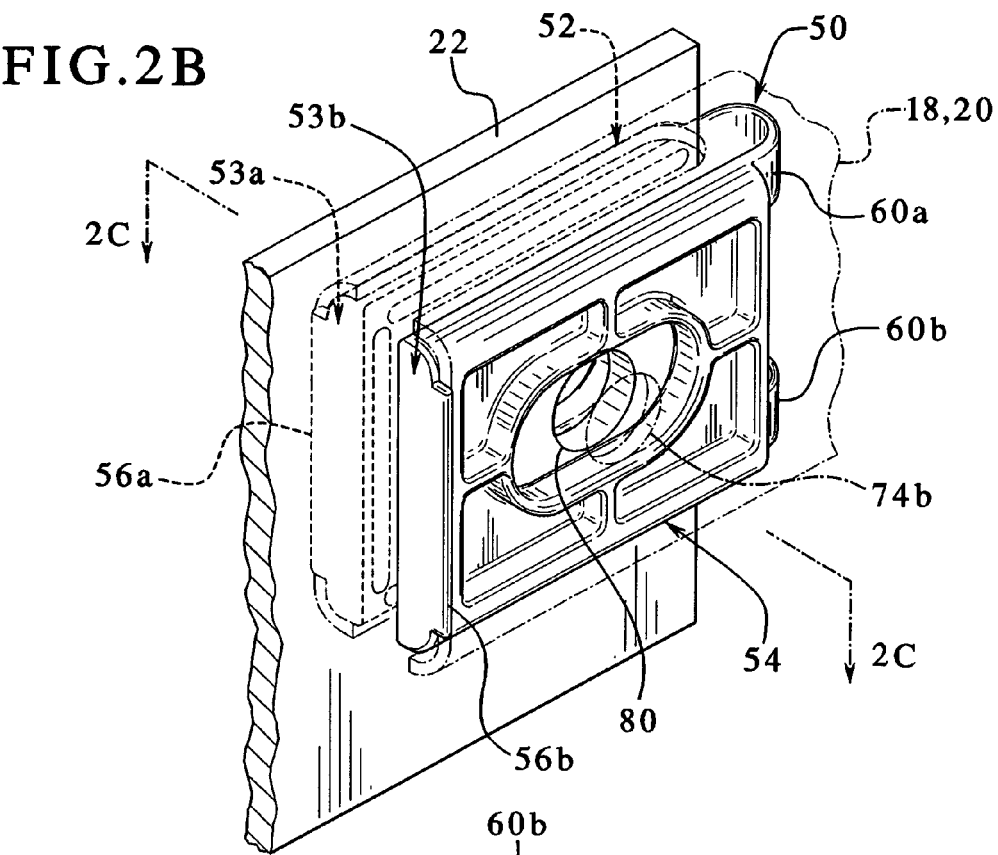
FIG. 2B is a fragmentary perspective view of one embodiment of the beam isolator of the present invention illustrating the beam isolator and the mounting bracket fully inserted into the end of the beam (shown in phantom).
Figure 2C:
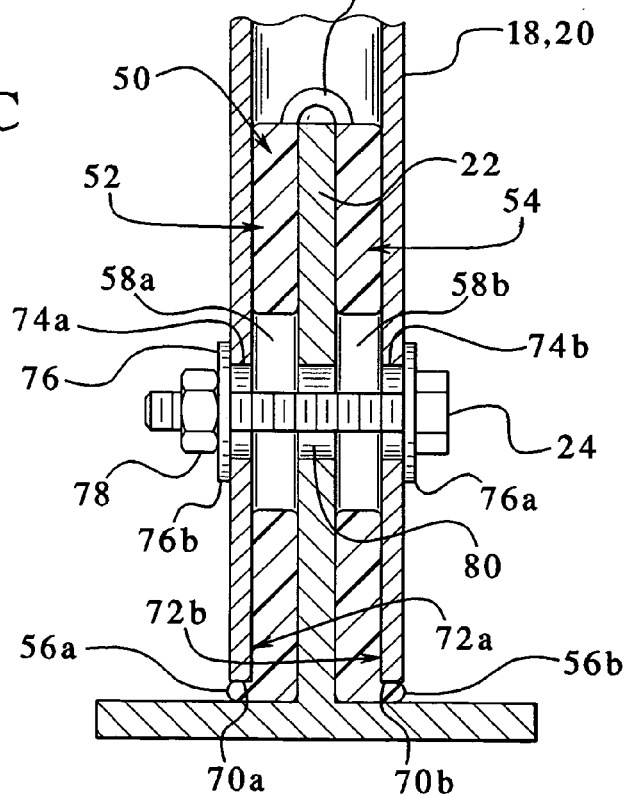
FIG. 2C is a cross-section view of the beam isolator and the mounting bracket fully inserted into the end of the beam taken generally along the line 2C—2C of FIG. 2B.

In one embodiment, stopping members or stopping lips 56a and 56b are attached to the ends 53a and 53b of the isolating pads 52 and 54, respectively. The stopping members transversely protrude, project or otherwise extend from the second ends of the first and second isolating pads. In one embodiment, the stopping members 56a and 56b are integrally formed with the first and second isolating pads 52 and 54. In another embodiment, the stopping members are separate members, which are attached to the ends 53a and 53b of the first and second isolating pads using a suitable attachment device or attachment method. The stopping members or stopping lips 56a and 56b project from the surface of each of the isolating pads to engage the ends or edges 70a and 70b of each side or side wall of the tubular beam as shown in FIG. 2C. As a result, the stopping members 56a and 56b prevent the beam isolator 50 from being inserted too far into the ends of the tubular beam. The stopping or positioning members also minimize the time spent by a user making sure that the beam isolators are inserted properly into the ends of the tubular beams. A user only needs to insert the beam isolators into the ends of the beams until the stopping members engage the ends or edges 70a and 70b of the beams. A user can therefore insert several beam isolators into the ends of a group, lot or batch of tubular beams in a short amount of time. This increases production efficiency and decreases costs.

In one embodiment, the first isolating pad 52 and the second isolating pad 54 define openings 58a and 58b, respectively, which are substantially aligned when the first isolating pad and the second isolating pad are moved, rotated or otherwise folded towards each other. In one embodiment, the openings 58a and 58b are larger than the openings 74a and 74b defined near the ends of the tubular beams and the openings 80 defined in the mounting brackets to account for potential misalignment problems, different sized connectors or different positions of the connectors once the connectors are inserted through the ends of the tubular beams and the mounting brackets. It should be appreciated that the openings 58a and 58b may be any suitable size or shape. The openings 58a and 58b enable a suitable connector such as a connector 24 to be inserted through the beam isolator 50 and mounting brackets to secure the ends of the tubular beams to the mounting brackets or side plates.

Figure 3A:
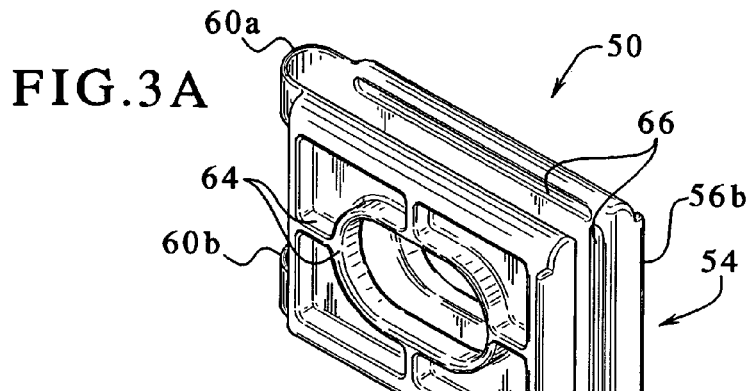
FIG. 3A is a front perspective view of one embodiment of the beam isolator of the present invention and illustrating the beam isolator in a substantially closed position.
Figure 3B:
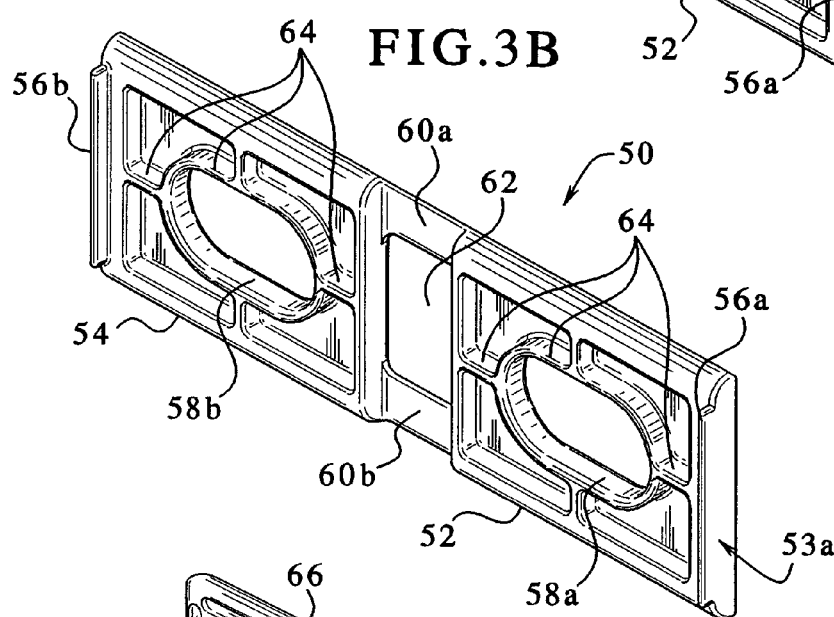
FIG. 3B is a front perspective view of the beam isolator of the embodiment of FIG. 3A and illustrating the beam isolator is in a substantially open position.
Figure 3C:
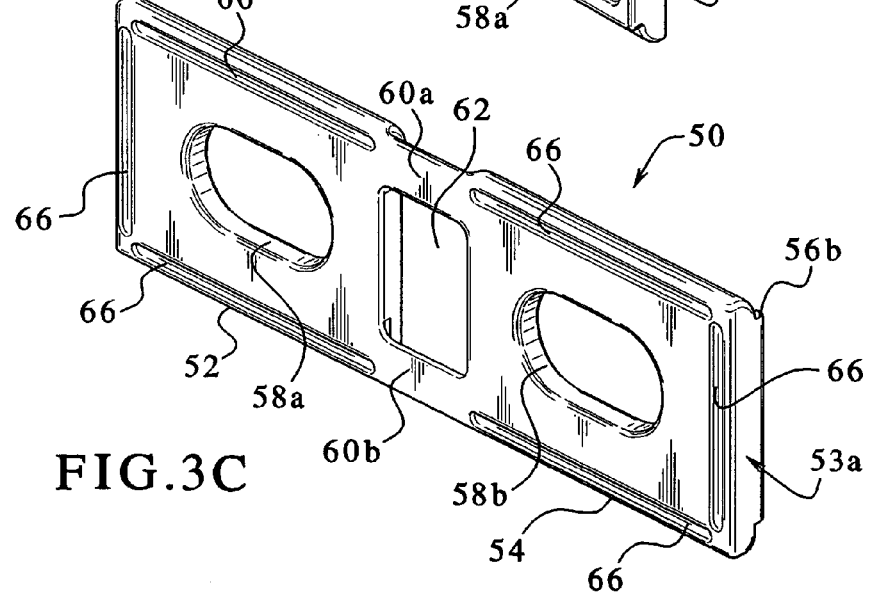
FIG. 3C is a rear perspective view of the embodiment of the beam isolator of FIG. 3B.

In one embodiment, the beam isolator 50 is manufactured using a suitable durable plastic or polymer material. It should be appreciated that any suitable self-lubricating material may be used to manufacture the beam isolators 50. In one embodiment, the beam isolators are manufactured using an injection molding process. Each cross beam isolator 50 is molded to a uniform thickness where release walls 64 and grooves 66 are formed in the beam isolators. Specifically, the release walls 64 are formed on one side of the first and second isolating pads and enable the molded beam isolators 50 to be easily released from an injection molding machine. The grooves 66 are formed on the opposite side of the beam isolator from the release walls as shown in FIG. 3C. Specifically, the grooves 66 are elongated grooves formed along the sides and ends of the first and second isolating pads. The grooves enable the beam isolators 50 to cool quickly and uniformly after the injection molding process is completed. The release walls and grooves therefore enhance the production efficiency of the beam isolator 50, which saves additional time and costs. As best illustrated in FIGS. 2A, 2B, 2C, 3A, 3B and 4, the support walls 64 also serve to prevent the deformation or crushing of the ends of the tubes or beams when the connector is tightened.

In another embodiment, the beam isolator 50 of the present invention includes different sizes such that the beam isolator can be inserted into railroad car beams, supports or braces of different sizes. It should be appreciated that the beam isolator may be any suitable size or shape.

Although the beam isolator is described as being manufactured using an injection molding process, it should be appreciated that the beam isolator may be manufactured using any suitable manufacturing process.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A railroad car beam isolator comprising:
   a first isolating pad defining a first opening;
   a second isolating pad defining a second opening;
   a hinge connected to a first end of the first isolating pad and a first end of the second isolating pad, wherein the hinge includes a first hinge member and a second hinge member connected to the first ends of the first and second isolating pads; and
   a stopping member attached to and transversely projecting from a second end of the first isolating pad, wherein when the first isolating pad is positioned substantially adjacent to the second isolating pad by moving the first isolating pad towards the second isolating pad about the hinge, the stopping member projects in a substantially opposing direction from the second isolating pad, and the first opening defined by the first isolating pad substantially aligns with the second opening defined by the second isolating pad.

2. The railroad car beam isolator of claim 1, wherein the stopping member is integrally formed with the first isolating pad.

3. The railroad car beam isolator of claim 1, wherein the first isolating pad and the second isolating pad are of a substantially uniform thickness.

4. The railroad car beam isolator of claim 1, wherein the first hinge member is spaced apart from the second hinge member.

5. The railroad car beam isolator of claim 1, wherein the hinge includes means for biasing the first isolating pad away from the second isolating pad when the first isolating pad is positioned substantially adjacent to the second isolating pad.

6. The railroad car beam isolator of claim 5, wherein the hinge includes a live hinge.

7. The railroad car beam isolator of claim 1, wherein the hinge includes a mechanical hinge.

8. The railroad car beam isolator of claim 1, wherein the first and second isolating pads include a polymer material.

9. A railroad car beam isolator comprising:
   a first isolating pad including a first end and a second end, said first isolating pad defining a first opening;
   a second isolating pad including a first end and a second end, said second isolating pad defining a second opening, said second isolating pad being rotatably connected to the first isolating pad by a hinge including a first hinge member and a second hinge member connected to the first ends of the first and second isolating pads; and
   a lip attached to and transversely projecting from the second end of the first isolating pad, wherein when the first isolating pad is rotated towards the second isolating pad and positioned substantially adjacent to the second isolating pad, the lip projects in a substantially opposing direction from the second isolating pad and the first opening defined by the first isolating pad substantially aligns with the second opening defined by the second isolating pad.

10. The railroad car beam isolator of claim 9, wherein the lip is integrally formed with the first isolating pad.

11. The railroad car beam isolator of claim 9, wherein the first isolating pad and the second isolating pad are of a substantially uniform thickness.

12. The railroad car beam isolator of claim 9, wherein the first hinge member is spaced apart from the second hinge member.

13. The railroad car beam isolator of claim 9, wherein the hinge includes means for biasing the first isolating pad away from the second isolating pad when the first isolating pad is rotated towards the second isolating pad and positioned substantially adjacent to the second isolating pad.

14. The railroad car beam isolator of claim 13, wherein the hinge includes a live hinge.

15. The railroad car beam isolator of claim 9, wherein the hinge includes a mechanical hinge.

16. The railroad car beam isolator of claim 9, wherein the first and second isolating pads include a polymer material.

17. In a railroad car having a plurality of walls, a mounting bracket attached to at least one of the walls and a tubular beam connected to the mounting bracket, the improvement being a beam isolator inserted into an end of the tubular beam which is connected to the mounting bracket to stabilize the tubular beam during movement of the railroad car, said beam isolator comprising:
   a first isolating pad defining a first opening;
   a second isolating pad defining a second opening;
   a hinge connected to a first end of the first isolating pad and a first end of the second isolating pad; and
   a stopping member attached to and transversely projecting from a second end of the first isolating pad, said stopping member engaging a first edge of the end of the tubular beam, wherein when the first isolating pad is positioned substantially adjacent to the second isolating pad by moving the first isolating pad towards the second isolating pad about the hinge, the stopping member projects in a substantially opposing direction from the second isolating pad and the first opening defined by the first isolating pad substantially aligns with the second opening defined by the second isolating pad.

18. The beam isolator of claim 17, wherein the stopping member is integrally formed with the first isolating pad.

19. The beam isolator of claim 17, wherein the first isolating pad and the second isolating pad are of a substantially uniform thickness.

20. The beam isolator of claim 17, wherein the hinge includes a first hinge member and a second hinge member connected to the first ends of the first and second isolating pads.

21. The beam isolator of claim 20, wherein the first hinge member is spaced apart from the second hinge member.

22. The beam isolator of claim 17, wherein the hinge includes means for biasing the first isolating pad away from the second isolating pad when the first isolating pad is positioned substantially adjacent to the second isolating pad.

23. The beam isolator of claim 22, wherein the hinge includes a live hinge.

24. The beam isolator of claim 17, wherein the hinge includes a mechanical hinge.

25. The beam isolator of claim 17, wherein the first and second isolating pads include a polymer material.

26. In a railroad car having a plurality of walls, a mounting bracket attached to at least one of the walls and a tubular beam connected to the mounting bracket, the improvement being a beam isolator inserted into an end of the tubular beam which is connected to the mounting bracket to stabilize the tubular beam during the movement of the railroad car, said beam isolator comprising:
   a first isolating pad including a first end and a second end, said first isolating pad defining a first opening;
   a second isolating pad including a first end and a second end, said second isolating pad defining a second opening, said second isolating pad being connected to the first isolating pad; and
   a lip attached to and transversely projecting from the second end of the first isolating pad, wherein when the first isolating pad is positioned substantially adjacent to the second isolating pad, the lip projects in a substantially opposing direction from the second isolating pad and the first opening defined by the first isolating pad substantially aligns with the second opening defined by the second isolating pad.

27. The beam isolator of claim 26, wherein the lip is integrally formed with the first isolating pad.

28. The beam isolator of claim 26, wherein the first isolating pad and the second isolating pad are of a substantially uniform thickness.

29. The beam isolator of claim 26, which includes a hinge connecting the first isolating pad to the second isolating pad.

30. The beam isolator of claim 26, wherein the first and second isolating pads include a polymer material.

31. In a railroad car having a plurality of walls, a mounting bracket attached to at least one of the walls and a tubular beam connected to the mounting bracket, the improvement being a beam isolator inserted into an end of the tubular beam which is connected to the mounting bracket to stabilize the tubular beam during the movement of the railroad car, said beam isolator comprising:
   a first isolating pad defining a first opening;
   a second isolating pad defining a second opening, said second isolating pad having a first end connected to a first end of the first isolating pad; and
   a stopping member attached to and transversely projecting from a second end of the first isolating pad, said stopping member engaging a first edge of said end of the tubular beam, wherein when the first isolating pad is positioned substantially adjacent to the second isolating pad, the stopping member projects in a substantially opposing direction to the second isolating pad and the first opening defined by the first isolating pad substantially aligns with the second opening defined by the second isolating pad.

32. The beam isolator of claim 31, wherein the stopping member is integrally formed with the first isolating pad.

33. The beam isolator of claim 31, wherein the first isolating pad and the second isolating pad are of a substantially uniform thickness.

34. The beam isolator of claim 31, which includes a hinge connecting the first isolating pad to the second isolating pad.

35. The beam isolator of claim 31, wherein the first and second isolating pads include a polymer material.

36. In a railroad car having a plurality of walls, a mounting bracket attached to at least one of the walls and a tubular beam connected to the mounting bracket, the improvement being a beam isolator inserted into an end of the tubular beam which is connected to the mounting bracket to stabilize the tubular beam during movement of the railroad car, said beam isolator comprising:
   first isolating means for isolating a first side wall of the tubular beam from the mounting, said first isolating means defining a first opening;
   second isolating means for isolating a second opposing side wall of the tubular beam from the mounting, said second isolating means defining a second opening;
   means for connecting a first end of the first isolating means to a first end of the second isolating means, wherein when the first isolating pad is positioned substantially adjacent to the second isolating pad, the first opening defined by the first isolating means substantially aligns with the second opening defined by the second isolating means; and
   stopping means connected to at least one of the first isolating means and second isolating means for preventing the beam isolator from being inserted too far into the tubular beam prior to mounting on the mounting bracket.

37. The beam isolator of claim 36, wherein the stopping means is integrally formed with the first isolating means.

38. The beam isolator of claim 36, wherein the first isolating means and the second isolating means are of a substantially uniform thickness.

39. The beam isolator of claim 36, wherein the connecting means includes a hinge connecting the first ends of the first and second isolating means.

40. The beam isolator of claim 36, wherein the connecting means includes means for biasing the first isolating means away from the second isolating means when the first isolating means is positioned substantially adjacent to the second isolating means.

41. The beam isolator of claim 40, wherein the connecting means includes a live hinge.

42. The beam isolator of claim 36, wherein the connecting means includes a mechanical hinge.

43. The beam isolator of claim 36, wherein the first and second isolating means include a polymer material.

* * * * *